(12) United States Patent
Barbosa et al.

(10) Patent No.: US 12,480,674 B2
(45) Date of Patent: Nov. 25, 2025

(54) HVAC EQUIPMENT HEALTH CHECK AFTER WEATHER EVENT

(71) Applicant: FPL SMART SERVICES, LLC, Juno Beach, FL (US)

(72) Inventors: Daniel J. Barbosa, Palm Beach Gardens, FL (US); Kurt A. Glover, Tequesta, FL (US)

(73) Assignee: FPL SMART SERVICES, LLC, Juno Beach, FL (US)

( * ) Notice: Subject to any disclaimer, the term of this patent is extended or adjusted under 35 U.S.C. 154(b) by 210 days.

(21) Appl. No.: 18/459,099

(22) Filed: Aug. 31, 2023

(65) Prior Publication Data

US 2025/0075925 A1    Mar. 6, 2025

(51) Int. Cl.
| | |
|---|---|
| G06Q 30/00 | (2023.01) |
| F24F 11/38 | (2018.01) |
| G06Q 10/20 | (2023.01) |
| F24F 110/10 | (2018.01) |
| F24F 140/60 | (2018.01) |

(52) U.S. Cl.
CPC ............ *F24F 11/38* (2018.01); *G06Q 10/20* (2013.01); *F24F 2110/10* (2018.01); *F24F 2140/60* (2018.01)

(58) Field of Classification Search
CPC .. F24F 11/38; F24F 11/52; F24F 11/64; F24F 2110/10; F24F 2140/60; G06Q 10/20
See application file for complete search history.

(56) References Cited

U.S. PATENT DOCUMENTS

| | | | | |
|---|---|---|---|---|
| 10,235,662 | B2* | 3/2019 | Curtis | G06Q 50/06 |
| 10,274,945 | B2* | 4/2019 | Arensmeier | G05B 23/024 |
| 11,175,061 | B2* | 11/2021 | Samuni | G06Q 50/06 |
| 11,394,462 | B2* | 7/2022 | Graham | H04L 12/18 |
| 11,441,800 | B2* | 9/2022 | Rowswell | F24F 11/56 |
| 11,802,703 | B2* | 10/2023 | Brahme | F24F 11/46 |
| 12,198,081 | B2* | 1/2025 | Rivera | G06Q 50/06 |
| 12,203,671 | B2* | 1/2025 | Brahme | F24F 11/65 |
| 2017/0148114 | A1* | 5/2017 | Liptsey-Rahe | G06Q 50/06 |
| 2018/0032969 | A1* | 2/2018 | Gillette | H04L 67/10 |
| 2018/0267494 | A1* | 9/2018 | Meranda | G06Q 10/063114 |
| 2021/0042574 | A1* | 2/2021 | Schwartz | G06N 20/00 |
| 2021/0072097 | A1* | 3/2021 | Trundle | F24F 11/62 |

(Continued)

OTHER PUBLICATIONS

Rakha, Tarek, et al. "Healthy, Intelligent, and Resilient Buildings and Urban Environments." IBPC 2018, 7th International Building Physics Conference, Syracuse, NY, Sep. 2018. (Year: 2018).*

(Continued)

*Primary Examiner* — Luis A Brown
(74) *Attorney, Agent, or Firm* — Tarolli, Sundheim, Covell & Tummino LLP (57) ABSTRACT

The present invention relates to a heating ventilation air conditioning (HVAC) monitor. The HVAC monitor queries a power database for historical and recovery power data and determines an average and daily power consumption of a customer premises. The HVAC monitor predicts the operational state of an HVAC system based on a comparison of the daily power consumption and average power consumption and triggers an alert for initiating remedial operations if the operational state of the HVAC system is below a performance threshold.

17 Claims, 5 Drawing Sheets

(56) References Cited

U.S. PATENT DOCUMENTS

| | | | |
|---|---|---|---|
| 2021/0123771 A1* | 4/2021 | Vega | H04Q 9/00 |
| 2021/0302054 A1* | 9/2021 | Delgoshaei | F24F 11/38 |
| 2022/0042712 A1* | 2/2022 | Delgoshaei | F24F 11/38 |
| 2022/0268472 A1* | 8/2022 | Hafernik | G05B 23/0283 |
| 2023/0194281 A1* | 6/2023 | Lane | G06Q 10/20 |
| 2023/0315135 A1* | 10/2023 | Reeder | G05D 23/1904 |
| | | | 700/300 |

OTHER PUBLICATIONS

Singh, Reshma, et al. "Scaling Building Energy Audits through Machine Learning Methods on Novel Drone Image Data." Lawrence Berkeley National Laboratory, Aug. 26, 2022. (Year: 2022).*

Arjunan, Pandarasamy, et al. "Operational Characteristics of Residential Air Conditioners with Temporally Granular Remote Thermographic Imaging." Association for Computing Machinery, Building Systems 2021, Nov. 17-18, 2021, Coimbra, Portugal. (Year: 2021).*

Jiang, Yuhan. "Building and Infrastructure Defect Detection and Visualization Using Drone and Deep Learning Technologies." Marquette University, Civil and Environmental Engineering Faculty, Research and Publications, 2021. (Year: 2021).*

Rafati, et al.: "Fault Detection and Efficiency Assessment for HVAC Systems Using Non-Intrusive Load Monitoring: A Review"; Energies 2022, 15(1), 341; https://doi.org/10.3390/en15010341 Revised: Dec. 19, 2021 / Accepted: Jan. 1, 2022 / Published: Jan. 4, 2022.

* cited by examiner

200

| Stress Free AC Customers | | | | |
|---|---|---|---|---|
| Customer Name | Street | City | Zip | |
| Customer1 | Address1 | Bradenton | 34205 | good ping and voltage - using KWH normally |
| Customer2 | Address2 | Ona | 33865 | cannot find in tool |
| Customer3 | Address3 | North Port | 34288 | good ping and voltage - using KWH normally |
| Customer4 | Address4 | Bradenton | 34212 | good ping and voltage - using KWH normally |
| Customer5 | Address5 | Bradenton | 34208 | good ping and voltage - using KWH normally |
| Customer6 | Address6 | Bradenton | 34208 | good ping and voltage - using KWH normally |
| Customer7 | Address7 | Bradenton | 34209 | good ping and voltage - using KWH normally |
| Customer8 | Address8 | Palmetto | 34221 | cannot find in tool |
| Customer9 | Address9 | | 34232 | cannot find in tool |
| Customer10 | Address10 | Englewood | 34223 | good ping and voltage - using KWH normally |
| Customer11 | Address11 | Palmetto | 34221 | good ping and voltage - using KWH normally |
| Customer12 | Address12 | Bradenton | 34208 | good ping and voltage - using KWH normally |
| Customer13 | Address13 | Bradenton | 34208 | good ping and voltage - using KWH normally |
| Customer14 | Address14 | Sarasota | 34234 | good ping and voltage - using KWH normally |
| Customer15 | Address15 | Bradenton | 34207 | good ping and voltage - using KWH normally |
| Customer16 | Address16 | Palmetto | 34221 | cannot find in tool |
| Customer17 | Address17 | Bradenton | 34203 | good ping and voltage - using KWH normally |
| Customer18 | Address18 | Bradenton | 34203 | good ping and voltage - using KWH normally |
| Customer19 | Address19 | Bradenton | 34207 | good ping and voltage - using KWH normally |
| Customer20 | Address20 | Brandon | 33511 | good ping and voltage - using KWH normally |
| Customer21 | Address21 | Bradenton | 34209 | good ping and voltage - using KWH normally |
| Customer22 | Address22 | Bradenton | 34205 | bad ping |
| Customer23 | Address23 | Venice | 34285 | good ping and voltage - using KWH normally |
| Customer24 | Address24 | Bradenton | 34207 | good ping and voltage - using KWH normally |
| Customer25 | Address25 | Bradenton | 34207 | good ping and voltage - using KWH normally |
| Customer26 | Address26 | At Pete | 33705 | cannot find in tool |
| Customer27 | Address27 | Tampa | 33611 | cannot find in tool |
| Customer28 | Address28 | Brandon | 33511 | cannot find in tool |
| Customer29 | Address29 | Palmetto | 34221 | good ping and voltage - using KWH normally |
| Customer30 | Address30 | Bradenton | 34210 | cannot find in tool |

| Customer31 | Address31 | Palmetto | 34221 | good ping and voltage - using KWH normally |
| Customer32 | Address32 | Ellenton | 34222 | good ping and voltage - using KWH normally |
| Customer33 | Address33 | Bradenton | 34205 | good ping and voltage - using KWH normally |
| Customer34 | Address34 | Bradenton | 34203 | cannot find in tool |
| Customer35 | Address35 | Nokomis | 34275 | good ping and voltage - using KWH normally |
| Customer36 | Address36 | Arcadia | 34266 | good ping and voltage - using KWH normally |
| Customer37 | Address37 | Bradenton | 34205 | good ping and voltage - using KWH normally |
| Customer38 | Address38 | Bradenton | 34209 | good ping and voltage - using KWH normally |
| Customer39 | Address39 | Sarasota | 34239 | cannot find in tool |
| Customer40 | Address40 | Nokomis | 34275 | good ping and voltage - using KWH normally |
| Customer41 | Address41 | Bradenton | 34203 | good ping and voltage - using KWH normally |
| Customer42 | Address42 | Bradenton | 34205 | good ping and voltage - using KWH normally |
| Customer43 | Address43 | Bradenton | 34202 | cannot find in tool |
| Customer44 | Address44 | Bradenton | 34207 | cannot find in tool |
| Customer45 | Address45 | Bradenton | 34208 | good ping and voltage - using KWH normally |
| Customer46 | Address46 | Arcadia | 34266 | good ping and voltage - using KWH normally |
| Customer47 | Address47 | Fort Myers | 33912 | good ping and voltage - using KWH normally |
| Customer48 | Address48 | Lehigh Acres | 33974 | cannot find in tool |
| Customer49 | Address49 | Fort Myers | 33916 | good ping and voltage - using KWH normally |
| Customer50 | Address50 | Naples | 34112 | cannot find in tool |
| Customer51 | Address51 | Fort Myers | 33905 | good ping and voltage - using KWH normally |
| Customer52 | Address52 | Fort Myers Beach | 33931 | bad ping |
| Customer53 | Address53 | Naples | 34120 | cannot find in tool |
| Customer54 | Address54 | Fort Myers | 33905 | bad ping |
| Customer55 | Address55 | Fort Myers | 33967 | good ping - low KWH usage |
| Customer56 | Address56 | Naples | 34119 | bad ping - good KWH usage |
| Customer57 | Address57 | Lehigh Acres | 33972 | cannot find in tool |
| Customer58 | Address58 | Fort Myers | 33908 | good ping and voltage - using KWH normally |
| Customer59 | Address59 | Fort Myers | 33916 | good ping and voltage - using KWH normally |
| Customer60 | Address60 | Lehigh Acres | 33976 | cannot find in tool |
| Customer61 | Address61 | Fort Myers | 33912 | good ping and voltage - using KWH normally |
| Customer62 | Address62 | Panama City | 32405 | cannot find in tool |

FIG. 2B

| | | | | |
|---|---|---|---|---|
| Customer63 | Address63 | Panama City | 32404 | cannot find in tool |
| Customer64 | Address64 | Southport | 32409 | cannot find in tool |
| Customer65 | Address65 | Lehigh Acres | 33971 | cannot find in tool |
| Customer66 | Address66 | Lehigh Acres | 33971 | cannot find in tool |
| Customer67 | Address67 | Lehigh Acres | 33936 | cannot find in tool |
| Customer68 | Address68 | Bonita springs | 34135 | good ping - low KWH usage |
| Customer69 | Address69 | Fort Myers | 33916 | good ping and voltage - using KWH normally |
| Customer70 | Address70 | Fort Myers | 33913 | good ping and voltage - using KWH normally |
| Customer71 | Address71 | Fort Myers | 33913 | good ping and voltage - using KWH normally |
| Customer72 | Address72 | Naples | 34110 | good ping and voltage - using KWH normally |
| Customer73 | Address73 | North Port | 34287 | good ping and voltage - using KWH normally |
| Customer74 | Address74 | Port Charlotte | 33954 | good ping and voltage - using KWH normally |
| Customer75 | Address75 | Port Charlotte | 33948 | good ping and voltage - using KWH normally |
| Customer76 | Address76 | Fort Myers | 33912 | good ping and voltage - using KWH normally |
| Customer77 | Address77 | Naples | 34110 | good ping and voltage - using KWH normally |
| Customer78 | Address78 | North Port | 34288 | good ping and voltage - using KWH normally |
| Customer79 | Address79 | Punta Gorda | 33983 | good ping and voltage - using KWH normally |
| Customer80 | Address80 | Port Charlotte | 33952 | This is an apartment/condo complex |
| Customer81 | Address81 | North Port | 34286 | bad ping |
| Customer82 | Address82 | Port Charlotte | 33948 | good ping - low KWH usage |
| Customer83 | Address83 | Parrish | 34219 | bad ping |
| Customer84 | Address84 | Punta Gorda | 33983 | good ping and voltage - using KWH normally |
| Customer85 | Address85 | Bradenton | 34208 | good ping and voltage - using KWH normally |
| Customer86 | Address86 | Sarasota | 34241 | good ping and voltage - using KWH normally |
| Customer87 | Address87 | Englewood | 34224 | cannot find in tool |

HVAC EQUIPMENT HEALTH CHECK AFTER WEATHER EVENT

TECHNICAL FIELD

The present disclosure relates to the prediction of an operational status of heating, ventilation and air conditioning (HVAC) systems after a weather event.

BACKGROUND

A smart meter is an electronic device that is used to measure and record the consumption of energy, such as electricity, gas or water, in real-time (e.g., within ten minutes). Unlike conventional meters, smart meters are connected to a wireless network, which allows the smart meters to send data to utility companies automatically, without the need for manual meter reading. This data can be used to monitor energy usage, identify trends, and tune the distribution of energy resources. Smart meters also allow consumers to track energy usage more easily and can help the customers make informed decisions about their consumption patterns. Additionally, smart meters can help utilities to detect and address outages more quickly, improving reliability and reducing downtime.

Heating, ventilation and air conditioning (HVAC) systems are used in residential and commercial buildings to maintain a comfortable indoor environment. However, HVAC systems consume a significant amount of energy, and their inefficient operation can result in high energy bills and increased greenhouse gas emissions. Various approaches have been proposed to monitor and tune the performance of HVAC systems. For example, some systems use sensors to measure temperature, humidity and other environmental parameters and adjust the HVAC system accordingly. Other systems use machine learning algorithms to predict the energy consumption of HVAC systems.

SUMMARY

A first example relates to a non-transitory machine-readable medium having machine-readable instructions for a heating ventilation air conditioning (HVAC) monitor. The machine-readable instructions for the HVAC monitor being executable by a processor core to perform operations including querying a power database for historical power data characterizing electrical power provided to a customer premises over a first interval of time prior to a weather event and recovery power data characterizing electrical power provided to the customer premises over a second interval of time subsequent to the weather event. The operations also include determining an average power consumption for the customer premises over the first interval of time based on the historical power data and determining a daily power consumption of the customer premises over the second interval of time based on the recovery power data, and predicting, based on a comparison of the daily power consumption of the customer premises and the average power consumption for the customer premises an operational state of an HVAC system at the customer premises and triggering an alert for initiating remedial operations responsive to a prediction that the operational state of the HVAC system of the customer premises is below a performance threshold.

A second example relates to a system for monitoring operations of HVAC systems operating at a plurality of customer premises, the system including: a non-transitory memory for storing machine-readable instructions and a processor core for accessing the memory and executing the machine-readable instructions. The machine-readable instructions including an HVAC monitor, the machine-readable instructions for the HVAC monitor being executable by the processor core to perform operations. The operations including querying a power database for historical power data characterizing electrical power provided to a set of the customer premises within a geographic region over a first interval of time prior to a weather event and for recovery power data characterizing electrical power provided to the set of customer premises over a second interval of time subsequent to the weather event. The operations include determining an average power consumption for the set of customer premises over the first interval of time based on the historical power data and predicting, based on a comparison of the daily power consumption of the customer premises and the average power consumption for the customer premises an operational state of an HVAC system at the set customer premises. The operations further include assigning a priority of remedial operations to each customer premises in the set of customer premises based on the predicted operational state of a corresponding HVAC system and initiating remedial operations to a subset of the set of customer premises that have a highest priority for remedial operations.

A third example relates to a method for predicting an operational state of HVAC systems operating at a plurality of customer premises. The method includes querying, by an HVAC monitor operating on a utility server, a power database for historical power data characterizing electrical power provided to a set of the customer premises within a geographic region over a first interval of time prior to a weather event and for recovery power data characterizing electrical power provided to the set of customer premises over a second interval of time subsequent to the weather event. The method also includes determining, by the HVAC monitor, an average power consumption for the set of customer premises over the first interval of time based on the historical power data and determining, by the HVAC monitor, a daily power consumption of the customer premises over the second interval of time based on the recovery power data. The method further includes predicting, by the HVAC monitor, based on a comparison of the daily power consumption of the customer premises and the average power consumption for the customer premises an operational state of an HVAC system at the set customer premises and assigning, by the HVAC monitor, a priority of remedial operations to each customer premises in the set of customer premises based on the predicted operational state of a corresponding HVAC system. The method further includes initiating, by the HVAC monitor, remedial operations to a subset of the set of customer premises that have a highest priority for remedial operations.

BRIEF DESCRIPTION OF THE DRAWINGS

FIGS. 2A-2C illustrate a spreadsheet that lists each customer premises and predicted power consumption.

DETAILED DESCRIPTION

This description relates to systems and methods for predicting an operational state of heating, ventilation and air conditioning (HVAC) systems operating at customer premises of a power distribution system. In many severe weather events, such as hurricanes, storms or tornadoes HVAC systems are damaged due to water intake (e.g., flooding). Thus, to predict the operational state of the HVAC systems, the system includes an HVAC monitor. The HVAC monitor analyzes records for each customer premises that has an HVAC system (or some subset thereof) and determines an average power consumption for the customer premises for a first interval of time (e.g., 7-10 days) prior to a start of the weather event. This average power consumption is compared to a daily power consumption for the same customer premises for a second interval of time (e.g., 7-10 days) after an end of the weather event. In situations where a daily power consumption for a given customer premises varied by a threshold amount (e.g., 10%) for the second interval of time, the given customer premises can be added to a list of premises that potentially have damaged HVAC systems.

Further, in some examples, the system can include a drone module to deploy drones to the premises in the list of premises that potentially have damaged HVAC systems. The drones can capture images of the premises in the list of premises to reveal a state of the promises, such as flooding, damaged roofs, fully operational lines running, etc. The images captured by the drones are employable to refine (e.g., remove premises and/or prioritize premises) the list of premises that potentially have damaged HVAC systems.

Additionally, the HVAC monitor can communicate with Internet of Things (IoT) devices implemented as smart thermostats at some (or all) of the premises in list of premises that potentially have damaged HVAC systems. The IoT module can retrieve data to determine if the HVAC systems installed at the premises that potentially have damaged HVAC systems are operating properly. For example, consider a first situation where a given smart thermostat reports that an interior temperature is set to 24 degrees Celsius (about 75 degrees Fahrenheit), but the given thermostat measures an ambient interior temperature of about 30 degrees Celsius (about 86 degrees Fahrenheit). This first situation could be indicative of high probability that the HVAC system associated with the given smart thermostat is not functionally properly. Conversely, consider a second situation where a given smart thermostat reports that an interior temperature is set to 24 degrees Celsius (about 75 degrees Fahrenheit), and the given smart thermostat measures an ambient interior temperature of about 24 degrees Celsius (about 75 degrees Fahrenheit). In the second situation, the premises associated with the given smart thermostat can be removed from the list of premises that potentially have damaged HVAC systems.

The HVAC system can communicate with a ticket interface system to request the generation of service tickets for the customer premises that potentially have damaged (or otherwise underperforming) HVAC systems. In response, the ticket interface system can generate service tickets for a service crew to inspect and/or repair the HVAC systems that may have damage. By employing the systems described herein, the number of site visits to the customer premises can be curtailed. In particular, the number of visits to customer premises where the HVAC is functioning properly can be curtailed, thereby decreasing the time needed to restore HVAC service to customer premises after the weather event.

Figure 1:
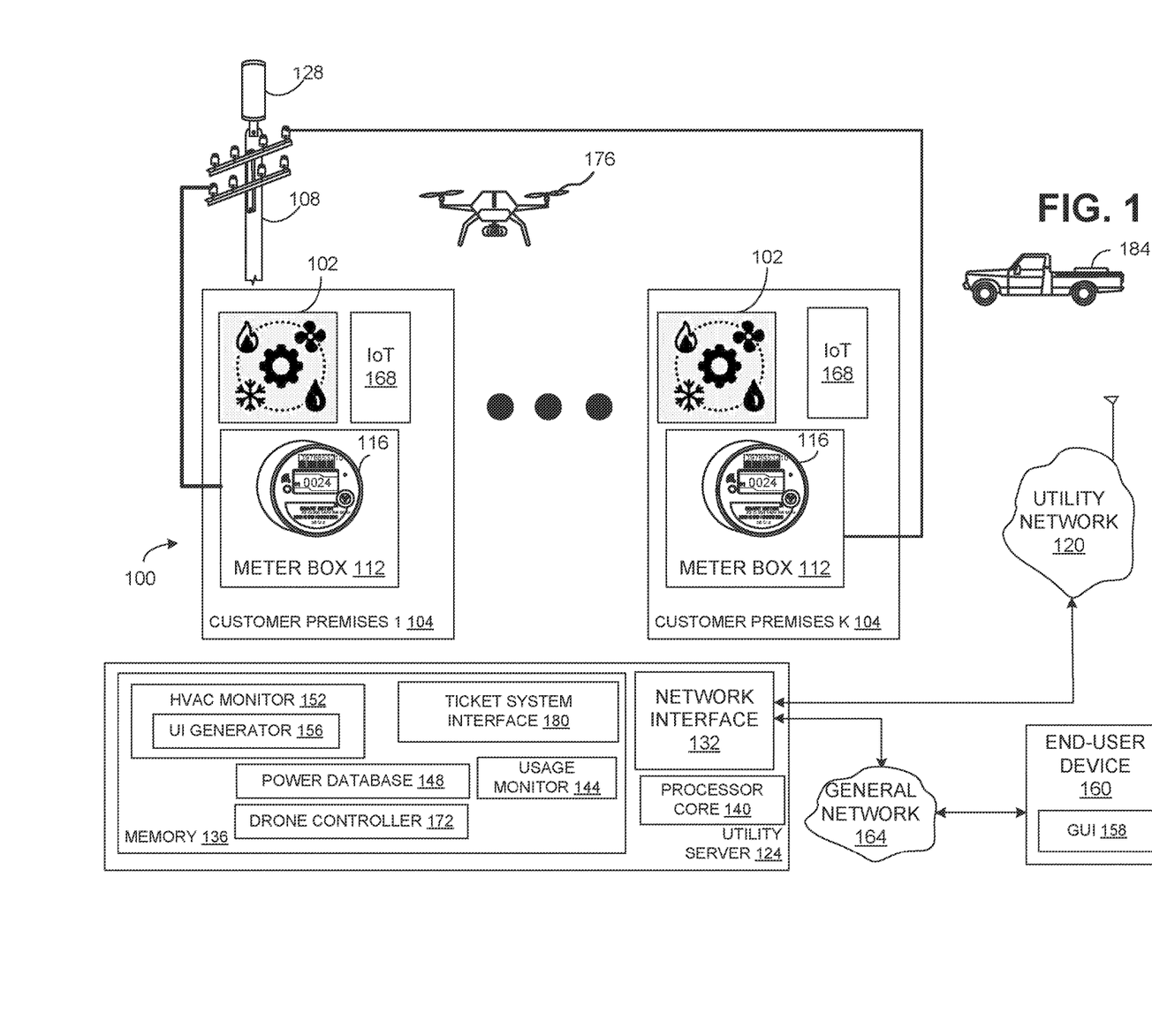
FIG. 1 illustrates an example of a system for monitoring an operational state of a heating ventilation (HVAC) system installed at customer premises that consume power.

FIG. 1 illustrates an example of a system 100 for monitoring operational state (e.g., health) of an HVAC system 102 installed at installed at K number of customer premises 104 that consume electricity, such as a residential customer premises or an industrial customer premises that receives power from a power distribution source 108 of a utility provider, where K is an integer greater than or equal to one. In the example illustrated, the customer premises 104 receives power, such as single-phase power, three-phase power, four-phase power, etc.

The K number of customer premises 104 (or some subset thereof) include a meter box 112 with a smart meter 116 installed therein. The smart meters 116 can monitor power consumption at a corresponding customer premises 104. The smart meters 116 are nodes on a utility network 120. In some examples, the utility network 120 is a mesh network. In such a situation, the smart meters 116 can communicate with each other to provide data to a utility server 124 operating on the utility network 120. In some examples, the power distribution source 108 is implemented with a telephone pole equipped with a transceiver 128 for communicating on the utility network 120.

Periodically (e.g., once per minute to once per hour) and/or asynchronously, (e.g., in response to a ping) the smart meters 116 provide power usage data to the utility server 124 through the utility network 120. In some examples, the power usage data is provided to the utility server 124 in response to a ping. In some examples, such as situations where the power is out at a particular customer premises 104, the corresponding smart meters 116 may not respond to a ping (e.g., often referred to as a "bad ping").

The utility server 124 is implemented with a computing platform. The utility server 124 can communicate with the utility network 120 through a network interface 132. The utility server 124 includes a memory 136. The memory 136 is implemented as a non-transitory machine-readable medium, such as volatile and/or nonvolatile memory, including random access memory (RAM), a solid-state drive (SSD), a hard disk drive (HDD) or a combination thereof. The memory 136 stores data and machine-readable instructions. The utility server 124 also includes a processor core 140 (or multiple processor cores) configured to access the memory 136 and execute the machine-readable instructions.

The utility server 124 could be implemented in a computing cloud. In such a situation, features of the utility server 124, such as the processor core 140, the network interface 132 and the memory 136 could be representative of a single instance of hardware or multiple instances of hardware with applications executing across the multiple of instances (i.e., distributed) of hardware (e.g., computers, routers, memory, processors or a combination thereof). Alternatively, the utility server 124 could be implemented on a single dedicated server.

The memory 136 includes a usage monitor 144. The usage monitor 144 processes incoming packets of usage power data from the K number of smart meters 116. Additionally, the usage monitor 144 stores usage power data in a power database 148. As noted, the usage power data is provided on a periodic and/or asynchronous basis. Thus, the power database 148 has records that identify historical power usage for the K number of smart meters 116, or some subset thereof. In some examples, the power database 148 stores location information (e.g., addresses, including zip codes, geographical coordinates, etc.) of each customer premises 104.

The memory 136 includes an HVAC monitor 152 that is configured to predict an operational status of the HVAC systems 102 at the K number of customer premises 104, or some subset thereof. The HVAC monitor 152 includes a user interface (UI) generator 156 that can provide a graphical user interface (GUI) 158 to an external system, such as an end-user device 160. In some examples, the GUI 158 can be a webpage for controlling operations of the HVAC monitor 152.

The end-user device 160 can be representative of a desktop computer, a laptop computer or a mobile device (e.g., a smartphone or a tablet computer). In some examples, the end-user device 160 communicates with the utility server 124 through a general network 164. The general network 164 can be representative of a public network (e.g., the Internet), a private network (e.g., a local area network) or a combination thereof (e.g., a virtual private network).

After a weather event (e.g., a hurricane, a tornado, a severe storm, etc.), a user of the end-user device 160 can employ the GUI 158 to request a prediction of the operational status for the HVAC systems 102 for a given geographic region that includes some or all of the K number of customer premises 104. The given geographic region may have experienced the weather event. In some examples, user input for the GUI 158 can include a zip code(s) or other location identifier that identifies the given geographic region that experience the weather event.

Responsive to the request for the operational status of the HVAC systems 102, the HVAC monitor 152 can query the power database 148 for historical power usage data of a set of customer premises 104 that are within the given geographic region for an interval of time (e.g., a first interval of time) prior to the weather event (e.g., 7-10 days before the start of the weather event). Additionally, responsive to the request, the HVAC monitor 152 can query the power database 148 for recovery power usage data for the set of customer premises 104 since an end of the weather event (e.g., 7-10 days after an ending date of the weather event).

The HVAC monitor 152 analyzes the historical power usage data for the subset of customer premises 104 for the interval of time prior to the weather event to determine an average historical power consumption for the subset of premises 104 prior to the weather event. Additionally, the HVAC monitor 152 analyzes the recovery power usage data for the subset of premises 104 after the weather event to determine a daily power usage data after the weather event (e.g., over a second interval of time).

The HVAC monitor 152 can compare the average historical power consumption for each customer premises 104 prior to the weather event to the daily power consumption after the weather event over the second interval of time. The HVAC monitor 152 can categorize each HVAC system 102 of the customer premises 104 in the set of customer premises 104 by a ping status (e.g., "good ping", "bad ping" or "cannot find") and by a power usage status (e.g., "normal power usage" or "low power usage"). Normal power usage indicates that the daily power consumption for an associated customer premises 104 after the weather event prior to the weather event has reduced by less than a threshold level (e.g., 10%) or has increased for each recorded daily power usage in the second interval of time. That is, normal power usage at a given customer premises 104 indicates that the given customer premises 104 has not seen a drop in power consumption as a result of the weather event.

Conversely, low power usage indicates that the daily power consumption for an associated customer premises 104 after the weather event has reduced by at least the threshold level (e.g., 10%) for recorded daily power usage in the second interval of time, or some subset thereof. That is, low power usage at a given customer premises 104 indicates that the given customer premises 104 has seen a drop in power consumption that is likely caused as a result of the weather event. Furthermore, the because the days following the weather event have variable power usage (e.g., due to evacuation), the HVAC monitor 152 can be configured to determine that the drop in power is not a result of the weather event if the there is only a single instance of consumed power being reduced by the threshold level.

FIGS. 2A-2C illustrate a spreadsheet 200 that lists each customer premises (labeled "Customer1" . . . "Customer87") and a corresponding address. Additionally, for each customer premises, the spreadsheet 200 lists a ping status (e.g., "good ping", "bad ping" or "cannot find in tool"). Additionally, in some examples, such as Customer80, the ping status can include information characterizing details about the premises, such as "this is an apartment/condo complex").

For the present example, it is presumed that a ping status of "cannot find in tool", indicates that the associated customer premises has been disconnected from power service (e.g., the customer premises is unoccupied or has been demolished). Additionally, customer premises with other nodes, such as Customer premises 80 are ignored in the present example.

Further in the spreadsheet 200, the customer premises have a power usage of "using KWH normally" or "low KWH usage", where KWH refers to the kilowatts hours used at the associated premises.

Referring back to FIG. 1, the HVAC monitor 152 is configured to predict that each HVAC system 102 of each customer premises 104 that has been categorized as having a good ping and a normal power usage (e.g., Customer1 of FIG. 2A) as an operational status of normal. Thus, in such a situation, no immediate remedial action is needed for this subset of customer premises 104 (e.g., a first subset of customer premises 104).

The HVAC monitor 152 is also configured to predict that each HVAC system 102 that has been categorized as having a good ping and low power usage (e.g., Customer56 and Customer68 of FIG. 2B) as being likely to be performing under a performance threshold, such as underperforming or experiencing a fault. Accordingly, in such a situation, the HVAC monitor 152 assigns this subset of highest priority of remedial action for this subset of customer premises 104 (e.g., a second subset of customer premises). Moreover, in some examples, the HVAC monitor 152 triggers an alert for the customer premises 104 in the second subset set of customer premises to indicate that remedial operations are to be initiated.

Further, the HVAC monitor 152 can be configured to predict that that each HVAC system 102 of each customer premises 104 that has been categorized as having a bad ping and a low power usage (e.g., customer premises 104) as an operational status possibly underperforming or experiencing a fault (e.g., operating under the performance threshold). Accordingly, in such a situation, the HVAC monitor 152 assigns this subset of medium priority of remedial action for this subset of customer premises 104 (e.g., a third subset of customer premises). Moreover, in some examples, the HVAC monitor 152 triggers an alert for the customer premises 104 in the third subset set of customer premises to indicate that remedial operations are to be initiated.

Further still, the HVAC monitor 152 can be configured to predict that each HVAC system 102 of each customer premises 104 that has been categorized as having a bad ping and a normal power usage (e.g., customer premises) has an operational status of unlikely experiencing a fault or underperforming (e.g., operating above the performance threshold). Accordingly, in such a situation, the HVAC monitor 152 assigns this subset of low priority of remedial action for this subset of customer premises 104 (e.g., a fourth subset of customer premises). Moreover, in some examples, the HVAC monitor 152 triggers an alert for the customer premises 104 in the fourth subset set of customer premises to indicate that remedial operations are to be initiated.

In response to determining the first-fourth subset of customer premises and the associated priorities of remedial action, the HVAC monitor 152 can be configured to triage remedial action based on the corresponding predicted likelihood that the HVAC system 102 of the corresponding customer premises 104 is experiencing operating under the performance threshold. For instance, the HVAC monitor 152 can execute remedial operations for the HVAC system 102 of the second subset of customer premises 104 that have a high likelihood of operating under the performance threshold, followed by remedial operations for the HVAC system 102 of the third subset of customer premises 104 and then followed by remedial operations for the HVAC system 102 of the third subset and possibly the fourth subset of customer premises 104.

The order of the execution of the remedial operations corresponds to a probability that additional time will obviate the need for remedial operations. For instance, for the second subset of the customer premises 104, it has already been determined that the ping is good (e.g., communication has been established with the corresponding smart meter 116), but that daily power consumption remains below the threshold level relative to the average power consumption for the corresponding customer premises 104 prior to the weather event. Because the HVAC system 102 is likely the largest power consuming device at each customer premises 104 in the second subset of customer premises 104, and because HVAC systems 102 are inherently exposed to weather events (e.g., a portion of HVAC systems 102 are outside), a drop in daily power usage after the weather event is a relatively strong indicator that the HVAC system 102 may be underperforming or experiencing a fault (e.g., due to damage). Thus, the second subset of customer premises is assigned the highest priority for the remedial operations.

Conversely, for the third subset of customer premises 104, it has been determined that the ping is bad (e.g., communication with the corresponding smart meter 116 has been intermittent), and that the daily power consumption remains below the threshold level relative to the average power consumption for the corresponding customer premises 104 prior to the weather event. Thus, there is an increased likelihood that the drop in power consumption for the customer premises 104 in the third subset of premises 104 is due to intermittent power availability at the corresponding customer premises 104 rather than a problem at the HVAC system 102. Accordingly, the third subset of customer premises are assigned a lower priority for the remedial operations than the second subset of customer premises 104. Additionally, with more time lapsing, there is also an increased likelihood that the power will be restored at the customer premises 104 in the third subset of customer premises 104, such that the remedial operations for some (or all) of the customer premises 104 in the third subset of customer premises 104 are no longer needed.

Further, for the fourth subset of customer premises 104, it has been determined that the ping is bad (e.g., communication with the corresponding smart meter 116 has been intermittent), and that the daily power consumption varies by less than the threshold level relative to the average power consumption for the corresponding customer premises 104 prior to the weather event. Thus, there is an increased likelihood that there is no drop in power consumption for the customer premises 104 in the third subset of premises 104, but there is intermittent power availability at the corresponding customer premises 104 rather than a problem at the HVAC system 102. Accordingly, the fourth subset of customer premises are assigned a lowest priority for the remedial operations (lower than the third subset of customer premises 104). Additionally, with more time lapsing, there is also an increased likelihood that the power will be restored at the customer premises 104 in the fourth subset of customer premises 104, such that the remedial operations for some (or all) of the customer premises 104 in the fourth subset of customer premises 104 are no longer needed.

Responsive to triaging the remedial operations, the HVAC monitor 152 can initiate conformational remedial operations for the second, third and fourth subsets of customer premises 104, if such conformational remedial operations are available. The conformational remedial operations can vary based on the availability of options. In various examples, none, some or all of the conformational remedial operations are available. Moreover, the remedial operations within can vary by customer premises 104.

In some examples, some or all of the K number of the customer premises 104 includes an IoT device 168 that communicates with and/or controls the corresponding HVAC system 102 that are employable for conformational remedial operations. For instance, the IoT device 168 could be a smart thermostat that can set an ambient temperature of an interior (indoors) of the customer premises 104. Thus, in situations where the IoT device 168 is available, the HVAC monitor 152 can ping the IoT device 168 for operational data of the HVAC system 102.

Responsive to the ping, the IoT device 168 can provide a set temperature (e.g., a desired temperature) and an ambient temperature of the corresponding customer premises 104 to the HVAC monitor 156. In examples where the set temperature differs from the ambient temperature by at least a threshold temperature difference (e.g., 2 degree Celsius, 3.6 degrees Fahrenheit) for more than an interval of time (e.g., 2 hours), the HVAC monitor 152 can determine that the HVAC system 102 of the corresponding customer premises 104 is underperforming or experiencing a fault (e.g., performing below the performance threshold). Conversely, in situations where the set temperature differs from the ambient temperature by less than the threshold, the HVAC monitor 152 can determine that the HVAC system 102 of the corresponding customer premises 104 is operating properly. Accordingly, this information can be employed to adjust the priority of further remedial operations. For instance, if a given customer premises 104 has been assigned a high, medium or low priority for remedial operations (e.g., the given customer premises 104 is assigned to the second-third subsets of customer premises 104), and the corresponding HVAC system 102 has been determined to be working properly, the given customer premises 104 can be reassigned to the first subset of customer premises that has no need for further remedial operations for the HVAC system 102. Alternatively, if a given customer premises 104 has been assigned medium or low priority for remedial operations (e.g., the given customer premises 104 is assigned to the third or fourth subsets of customer premises 104), and the corresponding HVAC system 102 has been determined to be underperforming or experiencing a fault (e.g., operating below the performance threshold), the given customer premises 104 can be reassigned to the second subset of customer premises that has the highest priority for remedial operations for the HVAC system 102.

Additionally or alternatively, to execute conformational remedial operations, the HVAC monitor 152 can communicate with a drone controller 172. The drone controller 172 can communicate with a drone 176 (which can be representative of a fleet of drones). The drone controller 172 can deploy the drone 176 to inspect the HVAC system 102 of customer premises 104 that may have an unperforming or faulting HVAC system 102 (e.g., operating below a performance threshold). Responsive to the deployment, the drone 176 travels to the corresponding customer premises 104 and captures an image of the HVAC system 102 (e.g., an exterior portion of the HVAC system 102) and/or the surrounding electrical infrastructure (e.g., power lines). The drone 176 returns the image to the drone controller 172, which in-turn returns the image to the HVAC monitor 152.

In some examples, the HVAC monitor 152 includes an image recognition algorithm (e.g., a machine learning algorithm) that can automatically determine or predict an operational state of the HVAC system 102 of the corresponding customer premises 104 based on the captured image. In other examples, the HVAC monitor 152 can output the image of the HVAC system 102 through the GUI 158 at the end-user device 160. In any such situation, physical damage (e.g., dents) and/or water damage of the HVAC system 102 may be identified in the image of the HVAC system 102 captured by the drone 176. Alternatively, if no damage is apparent at the HVAC system 200, but the powerlines (or other electrical infrastructure) to the customer premises 104 appear to be damaged, this information can indicate that the HVAC system 102 is working properly (and will work once power is restored to the customer premises 104). Accordingly, information extracted from the captured image is employable to adjust a priority of further remedial operations. Thus, the information automatically or manually derived from the image of the HVAC system 102 is employable to re-assign a priority to further remedial operations for the HVAC system 102 of the corresponding customer premises 104.

The memory 136 includes a ticket interface system 180 that is employable to communicate with a ticketing system that can dispatch a service crew 184 to inspect and/or repair HVAC systems 102 that are predicted to be performing below the performance threshold (e.g., underperforming or are experiencing a fault). However, it is desirable to deploy the service crew 184 to customer premises 104 that have an HVAC system 102 with a high likelihood of being underperforming or experiencing a fault (e.g., operating below the performance threshold). Stated differently, it is desirable to avoid dispatching the service crew 184 to customer premises 104 that have normally operating HVAC systems 102.

Accordingly, the HVAC monitor 152 is configured to provide the ticket interface system 180 with a request to open a service ticket for customer premises 104 in the second subset of customer premises 104 that have a corresponding HVAC system 102 with a highest priority for further remedial operations. If no HVAC system 102 have a highest priority for further remedial operations, the HVAC monitor 152 can request to open a service ticket for customer premises 104 in the third or fourth subsets of customer premises that have a medium or low priority for further remedial operations.

Responsive to the request to open a service ticket, the ticket interface system 180 interfaces with the ticket system to dispatch the service crew 184 to the appropriate customer premises 104. When/if the service crew 184 corrects problems with the HVAC system 102 at the customer premises 104, subsequent calculation of a daily power consumption at a particular customer premises 104 (with a repaired HVAC system 102) will more closely match the average power consumption prior to the weather event (e.g., below the power usage threshold). Thus, such customer premises 104 with repaired HVAC systems 102 are reassigned to the first subset of the customer premises 104 that have no need for further remedial operations.

By implementing the system 100, the number of wasted service calls by the service crew 184 can be curtailed. More specifically, by comparing an average power consumption of a customer premises 104 (over the first interval of time) prior to the weather event and the daily power consumption (over the second interval of time) can be employed to predict the operational status of the HVAC system 102 at the K number of customer premises 104 or some subset thereof. The predicted operational status is employable to assign a priority for remedial operations. Additionally, conformational remedial operations executable by the IoT device 168 and/or the drone 176 are employable to adjust a priority of the remedial operations. Accordingly, the probability that the service crew 184 is dispatched to a customer premises 104 with a normally functioning HVAC system 102 is reduced. In this manner, vital resources after the weather event are efficiently distributed.

Figure 3:
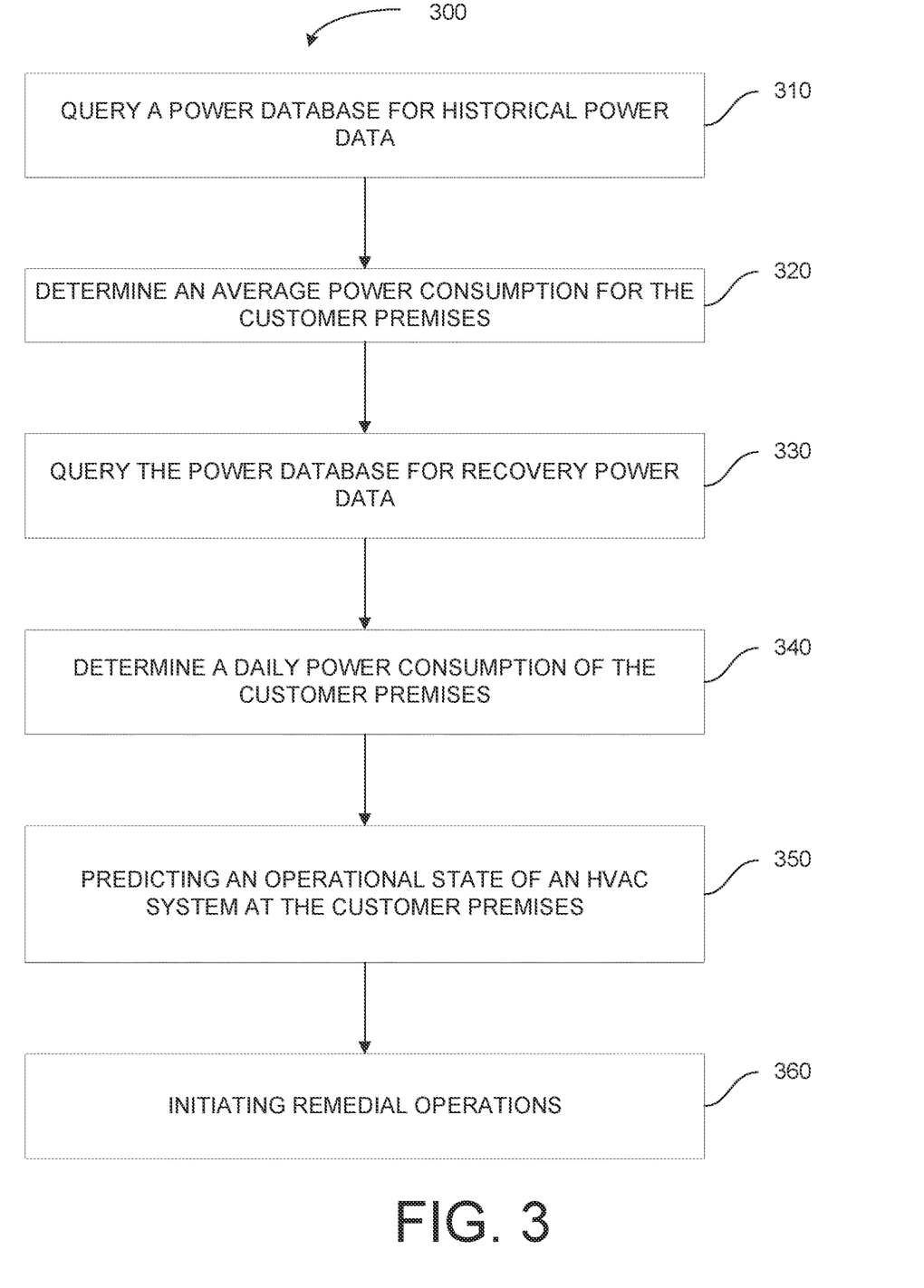
FIG. 3 illustrates an example of a method for monitoring an operational state of HVAC system operating at customer premises that consume power.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 is a flowchart of an example method 300 for predicting an operational status of HVAC systems (e.g., the HVAC system 102 of FIG. 1) operating at customer premises (e.g., the K number of customer premises 104 of FIG. 1). The method 300 can be implemented by an HVAC monitor (e.g., the HVAC monitor 152 of FIG. 1) executing on a utility server (e.g., the utility server 124 of FIG. 1).

At 310, the HVAC monitor queries a power database for historical power data characterizing electrical power provided to the customer premises in a geographical region over a first interval of time (e.g., 7-10 days) prior to a weather event. At 320, the HVAC monitor determines an average power consumption for the customer premises over the first interval of time based on the historical power data.

At 330, the HVAC monitor queries the power database for recovery power data characterizing electrical power provided to the customer premises over a second interval of time (e.g., 7-10 days) subsequent to the weather event. At 340, the HVAC monitor determines a daily power consumption of the customer premises over the second interval of time based on the recovery power data.

At 350, the HVAC monitor predicts, based on a comparison of the daily power consumption of the customer premises and the average power consumption for the customer premises, an operational state of the HVAC systems at the customer premises within the geographic region. At 360, the HVAC monitor initiates remedial operations responsive to a prediction that the operational state of the HVAC system of the customer premises is below a performance threshold.

In view of the foregoing structural and functional description, those skilled in the art will appreciate that portions of the systems and method disclosed herein may be embodied as a method, data processing system, or computer program product such as a non-transitory computer readable medium.

Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices and magnetic storage devices.

Certain examples have also been described herein with reference to block illustrations of methods, systems and computer program products. It will be understood that blocks of the illustrations, and combinations of blocks in the illustrations, can be implemented by computer-executable instructions. These computer-executable instructions may be provided to one or more processors of a general-purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions for a heating ventilation air conditioning (HVAC) monitor, the machine-readable instructions for the HVAC monitor being executable by a processor core to perform operations comprising:
   querying a power database for historical power data characterizing electrical power provided to a customer premises over a first interval of time prior to a weather event and recovery power data characterizing electrical power provided to the customer premises over a second interval of time subsequent to the weather event;
   determining an average power consumption for the customer premises over the first interval of time based on the historical power data;
   determining a daily power consumption of the customer premises over the second interval of time based on the recovery power data;
   predicting, based on a comparison of the daily power consumption of the customer premises and the average power consumption for the customer premises an operational state of an HVAC system at the customer premises; and
   initiating remedial operations for the customer premises in response to a prediction that the operational state of the HVAC system at the customer premises is below a performance threshold, wherein the remedial operations comprise:
      requesting a drone controller to deploy a drone to a location of the customer premises to capture an image characterizing a physical state of the HVAC system of the customer premises;
      receiving, from the drone controller, the captured image; and
      adjusting a priority of remedial operations for the customer premises based on the captured image.

2. The non-transitory medium of claim 1, wherein the remedial operations further comprise providing a ticket interface system with a request for a service call to the customer premises.

3. The non-transitory medium of claim 1, wherein the remedial operations further comprise confirmational remedial operations including receiving, from a smart thermostat operating at the customer premises for data characterizing an ambient temperature of the customer premises and a set temperature of the customer premises.

4. The non-transitory medium of claim 3, wherein the confirmational remedial operations include removing a need for remedial operations for the customer premises based on the set temperature and the ambient temperature varying by less than a threshold temperature difference over a third interval of time.

5. The non-transitory medium of claim 3, wherein the confirmational remedial operations include setting a priority for remedial operations to a highest level for the customer premises based on the set temperature and the ambient temperature varying by at least a threshold temperature difference over a third interval of time.

6. The non-transitory medium of claim 1, wherein the first interval of time is at least seven days prior to a start of the weather event, and the second interval of time is at least seven days after an end of the weather event.

7. A system for monitoring operations of heating ventilation air conditioning (HVAC) systems operating at a plurality of customer premises, the system comprising:
  a non-transitory memory for storing machine-readable instructions; and
  a processor core for accessing the memory and executing the machine-readable instructions, the machine-readable instructions comprising an HVAC monitor, the machine-readable instructions for the HVAC monitor being executable by the processor core to perform operations comprising:
    querying a power database for historical power data characterizing electrical power provided to a set of the customer premises within a geographic region over a first interval of time prior to a weather event and for recovery power data characterizing electrical power provided to the set of customer premises over a second interval of time subsequent to the weather event;
    determining an average power consumption for the set of customer premises over the first interval of time based on the historical power data;
    determining a daily power consumption of the customer premises over the second interval of time based on the recovery power data;
    predicting, based on a comparison of the daily power consumption of the customer premises and the average power consumption for the customer premises an operational state of an HVAC system at the set customer premises;
    assigning a priority of remedial operations to each customer premises in the set of customer premises based on the predicted operational state of a corresponding HVAC system; and
    executing confirmational remedial operations for a subset of the set of customer premises that have a highest priority for remedial operations, wherein the confirmation remedial operations include:
      requesting a drone controller to deploy a drone to a location of a given customer premises of the set of customer premises to capture an image characterizing a physical state of the HVAC system of the given customer premises;
      receiving, from the drone controller, the captured image; and
      adjusting a priority of remedial operations for at least the subset of the customer premises based on the captured image.

8. The system of claim 7, wherein the confirmational remedial operations are executed for customer premises of the set of customer premises that are predicted to have an HVAC system operating below a threshold level.

9. The system of claim 8, wherein the confirmational remedial operations further comprise:
  receiving, from a smart thermostat operating at a given customer premises of the set of customer premises, data characterizing an ambient temperature of the given customer premises and a set temperature of the given customer premises; and
  adjusting the priority of the remedial operations for the given customer premises based on a comparison between the ambient temperature and the set temperature at the given customer premises.

10. The system of claim 9, wherein the adjusting comprises removing a need for remedial operations for the given customer premises based on the set temperature and the ambient temperature being less than a threshold temperature difference over a third interval of time.

11. The system of claim 9, wherein the adjusting comprises setting the priority for remedial operations for the given customer premises based on the set temperature and the ambient temperature varying by at least a threshold temperature difference over a third interval of time.

12. The system of claim 7, wherein the remedial operations further comprise providing a ticket interface system with a request for a service call to a given customer premises of the set of the customer premise responsive to a prediction that the HVAC system at the given customer premises is operating at a level below an operational threshold.

13. A method for predicting an operational state of heating ventilation air conditioning (HVAC) systems operating at a plurality of customer premises, the method comprising:
  querying, by an HVAC monitor operating on a utility server, a power database for historical power data characterizing electrical power provided to a set of the customer premises within a geographic region over a first interval of time prior to a weather event and for recovery power data characterizing electrical power provided to the set of customer premises over a second interval of time subsequent to the weather event;
  determining, by the HVAC monitor, an average power consumption for the set of customer premises over the first interval of time based on the historical power data;
  determining, by the HVAC monitor, a daily power consumption of the customer premises over the second interval of time based on the recovery power data;
  predicting, by the HVAC monitor, based on a comparison of the daily power consumption of the customer premises and the average power consumption for the customer premises an operational state of an HVAC system at the set customer premises;
  assigning, by the HVAC monitor, a priority of remedial operations to each customer premises in the set of customer premises based on the predicted operational state of a corresponding HVAC system; and
  initiating, by the HVAC monitor, confirmational remedial operations to a subset of the set of customer premises that have a highest priority for remedial operations, the confirmational remedial operations comprising:
    requesting a drone controller to deploy a drone to a location of a given customer premises of the set of customer premises to capture an image characterizing a physical state of the HVAC system of the given customer premises;
    receiving, from the drone controller, the captured image; and
    adjusting a priority of remedial operations for at least the subset of the customer premises based on the captured image.

14. The method of claim 13, wherein the confirmational remedial operations further comprising:
  receiving, from a smart thermostat operating at the given customer premises of the set of customer premises, data characterizing an ambient temperature of the given customer premises and a set temperature of the given customer premises; and
  adjusting the priority of the remedial operations for the given customer premises based on a comparison between the ambient temperature and the set temperature at the given customer premises.

15. The method of claim 14, wherein the adjusting comprises removing a need for remedial operations for the given customer premises based on the set temperature and the ambient temperature varying by less than a threshold temperature difference over a third interval of time.

16. The method of claim 14, wherein the adjusting comprises setting the priority for remedial operations for the given customer premises based on the set temperature and the ambient temperature varying by at least a threshold temperature difference over a third interval of time.

17. The method of claim 13, wherein the remedial operations include providing a ticket interface system with a request for a service call to a given customer premises of the set of the customer premise responsive to a prediction that the HVAC system at the given customer premises is operating at a level below an operational threshold.

* * * * *